(No Model.)

W. S. BOWEN.
FENDER FOR STREET CARS.

No. 587,178.  Patented July 27, 1897.

WITNESSES

INVENTOR,
WILLIAM S. BOWEN,
By John Wedderburn
Attorney

UNITED STATES PATENT OFFICE.

WILLIAM S. BOWEN, OF PHILADELPHIA, PENNSYLVANIA.

FENDER FOR STREET-CARS.

SPECIFICATION forming part of Letters Patent No. 587,178, dated July 27, 1897.

Application filed February 19, 1897. Serial No. 624,133. (No model.)

*To all whom it may concern:*

Be it known that I, WILLIAM S. BOWEN, a citizen of the United States, residing at Philadelphia, in the county of Philadelphia and State of Pennsylvania, have invented certain new and useful Improvements in Fenders for Street-Cars; and I do hereby declare the following to be a full, clear, and exact description of the invention, such as will enable others skilled in the art to which it appertains to make and use the same.

This invention has reference to a novel construction in a fender and is adapted more especially for use in connection with street-cars, although it can be used in other relations.

The object of the invention is to provide a novel and effective means for throwing the fender into operative position.

The invention consists in the features of construction hereinafter described and specifically claimed.

Figure 1:
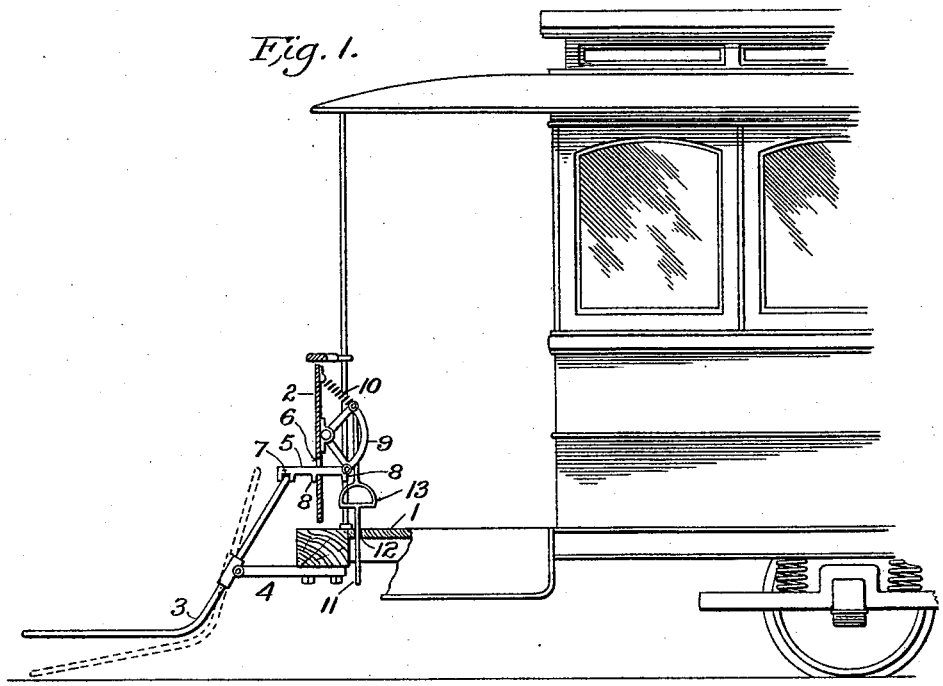
Figure 2:
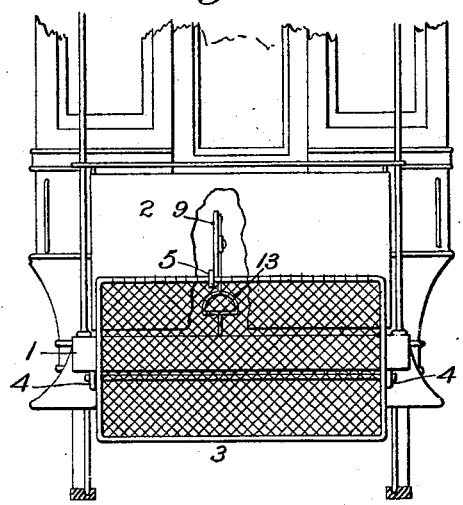

In the accompanying drawings, forming a part of this specification, Figure 1 is a side elevation of the forward end portion of a car provided with this invention, certain parts being broken away for convenience of illustration. Fig. 2 is a front end elevation.

Referring now to said drawings, 1 indicates the platform, and 2 the dashboard of a car. The fender 3 consists, preferably, of a rigid frame covered by a suitable netting and is hinged to the projections 4 of the platform. The means for holding said fender in an elevated position, as shown in full lines in Fig. 1, consists of a longitudinally-sliding bar 5, mounted in a guide-slot 6 in the dashboard 2. This bar 5 is provided with a socket 7 at its front end to engage the upper edge of the fender, while it is provided at its rear end portion with two stops 8 to limit the movement thereof within the guide-slot 6. To the rear end of the bar 5 is fastened a pivoted lever or segment 9. A spring 10 is connected with said lever or segment 9 and serves to swing the same upon its pivot in a direction to retract the bar 5, while an operating-rod 11 is also connected with said segment and moves in a guide-opening 12 on the platform 1. This operating-rod 11 is provided with a stirrup 13, by means of which it can be depressed.

The operation is as follows: The strength of the spring 10 is sufficient to slightly overbalance the fender, so that it normally holds the fender in an elevated position, as shown in Fig. 1 in full lines. It is obvious, therefore, that the slightest weight, even that of a child, coming in contact with the forward end of the fender will throw the same upon its pivot to the position shown in dotted lines in said figure, while it will be understood at the same time that the fender can be thrown to this position by the motorman and without removing his hand from the brake or controller. It is understood, of course, that the fender can be quickly removed from one end of the car to the other by simply lifting the bar 5 from the upper edge of the fender and removing the pivots.

Having thus described my invention, what I claim as new, and desire to secure by Letters Patent, is—

The combination with the stationary part of a vehicle having a pivoted fender, of a pivoted lever mounted upon said vehicle, a bar pivoted to said lever and extending through a guide-slot in the vehicle, a socket upon the outer end of said bar to receive an edge of said fender, stops upon said bar to limit the longitudinal movement thereof, a spring for moving said lever in one direction, and an operating-rod for moving it in the other direction, substantially as described.

In testimony whereof I have signed this specification in the presence of two subscribing witnesses.

WILLIAM S. BOWEN.

Witnesses:
WM. J. SHETTSLINE,
D. J. MCBRIDE.